O. E. FULLER.
CULTIVATOR ATTACHMENT.
APPLICATION FILED NOV. 21, 1918.
1,369,970.
Patented Mar. 1, 1921.
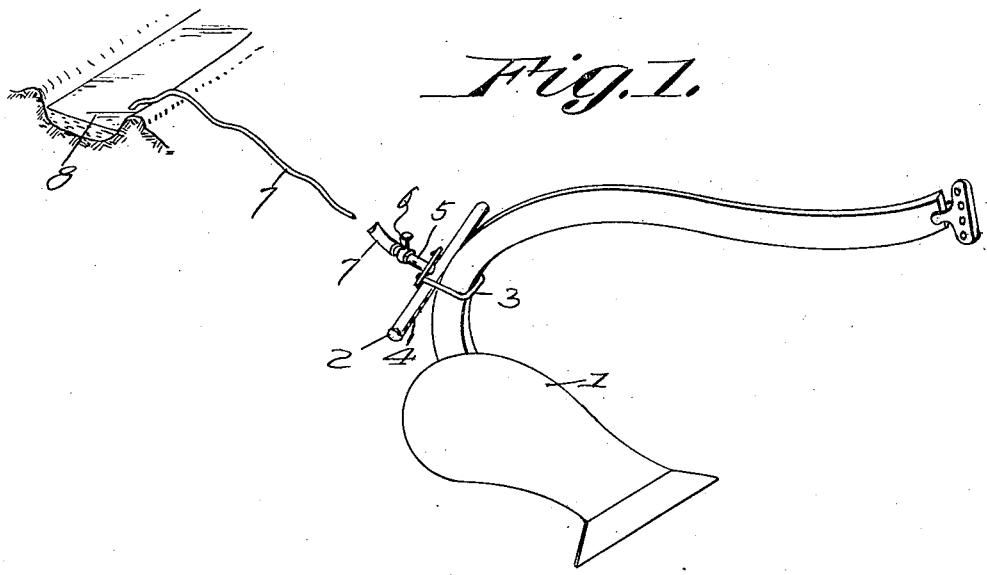
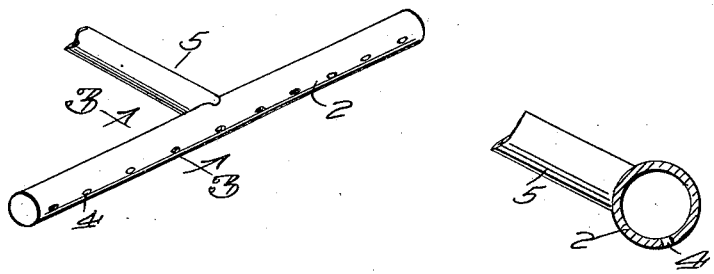
Inventor
Orie E. Fuller,
By G. Hume Talbert,
Attorney

UNITED STATES PATENT OFFICE.

ORIE E. FULLER, OF LOS GATOS, CALIFORNIA.

CULTIVATOR ATTACHMENT.

1,369,970.  Specification of Letters Patent.  Patented Mar. 1, 1921.

Application filed November 21, 1918. Serial No. 263,557.

*To all whom it may concern:*

Be it known that I, ORIE E. FULLER, a citizen of the United States of America, residing at Los Gatos, in the county of Santa Clara and State of California, have invented new and useful Improvements in Cultivator Attachments, of which the following is a specification.

The purpose of the invention is to provide an attachment for a tillage implement both to till and irrigate the soil simultaneously. To this end the invention comprises a tubular member arranged to discharge sprays of water, this tubular member being mounted on the beam or frame of the implement in conjunction with which it is used. It is provided with a control cock and is equipped with a flexible tubular member or hose that is led to a source of water supply, such as a tank or irrigation ditch.

A further purpose of the invention is to provide an attachment of this character which is simple in construction, durable and effective in operation and inexpensive to manufacture.

To the specific construction in which it is shown and described, the invention is not to be restricted. The right is reserved to make such changes or alterations as the actual reduction to practice may suggest, provided such changes or alterations are compatible in spirit with the subjoined claims.

In the accompanying drawings:

Figure 1 is a perspective view showing the practical application of the invention.

Fig. 2 is a perspective view of the attachment *per se*.

Fig. 3 is a section on the line 3—3 of Fig. 2.

As shown, the invention is employed in conjunction with the plow 1, although it is obvious that it may be used in conjunction with harrows, cultivators, or any other character of tillage implement so long as suitable means is provided for supporting it thereon. It is attached to the beam of the plow 1 and comprises the tubular member 2 which is held on the beam by suitable clamps 3. This tubular member 2 is closed at both ends and extending longitudinally on the under side there are formed the perforations 4 which serve as water outlets. The tubular member 2 is formed integral with a right angularly disposed tubular leg 5 extending to the handle of the plow 1 and including in its construction a cock 6. The extremity of the leg 5 connects with one end of a flexible tubular member 7 preferably a hose and the latter leads to the irrigation ditch indicated at 8.

It is obvious that when the cock 6 is open, water may be supplied from the ditch 8 in any of the usual ways and this water will thus be admitted to the tubular member 2 and distributed over ground through the perforations 4, the positioning of the tubular member 2 on the plow being such that the ground is upset prior to the distribution of the water.

The invention having been described, what is claimed as new and useful is:

The combination with a tillage implement, of a tubular member formed with uniformly spaced longitudinally disposed perforations at one side, and having both ends closed and being provided with a laterally projecting tubular leg substantially opposite the perforations, means for clamping the tubular member to the implement, and valve controlled means for admitting water to said tubular member from an irrigation ditch, in the manner and for the purpose herein specified.

In testimony whereof I affix my signature.

ORIE E. FULLER.